(12) United States Patent
Miranda

(10) Patent No.: US 9,802,651 B2
(45) Date of Patent: Oct. 31, 2017

(54) VEHICLE BODY STRUCTURE

(71) Applicant: Nissan North America, Inc., Franklin, TN (US)

(72) Inventor: Francisco Aguirre Miranda, Calimaya Estado de Mexico (MX)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/044,423

(22) Filed: Feb. 16, 2016

(65) Prior Publication Data

US 2017/0233009 A1     Aug. 17, 2017

(51) Int. Cl.
*B62D 25/00* (2006.01)
*B62D 25/04* (2006.01)
*B60R 22/24* (2006.01)
*B62D 25/02* (2006.01)

(52) U.S. Cl.
CPC .............. *B62D 25/04* (2013.01); *B60R 22/24* (2013.01); *B62D 25/02* (2013.01)

(58) Field of Classification Search
CPC .......... B62D 25/04; B62D 25/02; B60R 22/24
USPC .................................................... 296/193.05
See application file for complete search history.

(56) References Cited

U.S. PATENT DOCUMENTS

| | | | |
|---|---|---|---|
| 6,254,174 B1 | 7/2001 | Wee | |
| 6,279,990 B1 | 8/2001 | Miyasaka et al. | |
| 6,827,390 B2 | 12/2004 | Zummallen et al. | |
| 7,357,448 B2 | 4/2008 | Chen et al. | |
| 7,543,882 B2 | 6/2009 | Day et al. | |
| 7,581,783 B2 | 9/2009 | Mori et al. | |
| 7,735,906 B2 | 6/2010 | Takahashi et al. | |
| 7,815,247 B2 | 10/2010 | Obayashi | |
| 8,033,595 B2 * | 10/2011 | Orii ........................ | B62D 25/06 280/801.1 |
| 8,128,157 B2 | 3/2012 | Heo et al. | |
| 8,651,562 B2 | 2/2014 | Zornack et al. | |
| 8,662,567 B2 | 3/2014 | Aul et al. | |
| 8,905,464 B2 | 12/2014 | Gunther et al. | |
| 2008/0036235 A1 * | 2/2008 | Ameloot ................ | B62D 25/04 296/102 |
| 2012/0119477 A1 | 5/2012 | Kim | |
| 2012/0161475 A1 | 6/2012 | Mori | |
| 2012/0256445 A1 | 10/2012 | Baccouche et al. | |

(Continued)

*Primary Examiner* — Joseph D Pape
*Assistant Examiner* — Dana Ivey
(74) *Attorney, Agent, or Firm* — Global IP Counselors, LLP

(57) ABSTRACT

A vehicle body structure includes an outer body panel and a reinforcement panel. The outer body panel at least partially defines a pillar portion that has a front edge that at least partially defines a door opening, and a rear edge that at least partially defines a rear window opening. The reinforcement panel is rigidly fixed to the outer body panel and includes an upper attachment section, a lower attachment section and a main section that extends between the upper attachment section and the lower attachment section. The upper attachment section is attached to the outer body panel. The lower attachment section extends downward from the main section to proximate a lower edge of the rear window opening. The main section includes a first contoured area defining a first seatbelt anchor support and a second area spaced apart from the first contoured area that defines a second seatbelt anchor support.

15 Claims, 9 Drawing Sheets

(56) References Cited

U.S. PATENT DOCUMENTS

2012/0261950 A1 10/2012 Balzer et al.
2012/0313400 A1 12/2012 Balzer et al.

\* cited by examiner

# VEHICLE BODY STRUCTURE

BACKGROUND

Field of the Invention

The present invention generally relates to a vehicle body structure. More specifically, the present invention relates to a vehicle body structure with a rear pillar assembly having a reinforcement panel installed between inner and outer body panels, the reinforcement panel including a first seatbelt anchor support and a second seatbelt anchor support.

Background Information

A vehicle body structure with pillar assemblies often includes seatbelt anchor supports that are welded to an inboard surface of outer body panels that define the pillar assemblies.

SUMMARY

One object of the invention is to provide a pillar assembly with a reinforcement panel that strengthens the pillar assembly and also includes seatbelt anchor supports located within the pillar assembly.

In view of the state of the known technology, one aspect of the present disclosure is to provide a vehicle body structure with an outer body panel and a reinforcement panel. The outer body panel has a floor supporting portion, a roof rail portion and a pillar portion that at least partially defines a passenger compartment. The pillar portion at least partially defines a pillar assembly that extends from the floor supporting portion to the roof rail portion. The pillar portion has a front edge that at least partially defines a door opening, and a rear edge that at least partially defines a rear window opening. The reinforcement panel is rigidly fixed to the outer body panel and includes an upper attachment section, a lower attachment section and a main section that extends between the upper attachment section and the lower attachment section. The upper attachment section is attached to the outer body panel along the roof rail portion. The lower attachment section extends downward from the main section to proximate a lower edge of the rear window opening. The main section includes a first contoured area that defines a first seatbelt anchor support and a second area spaced apart from the first contoured area that defines a second seatbelt anchor support.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
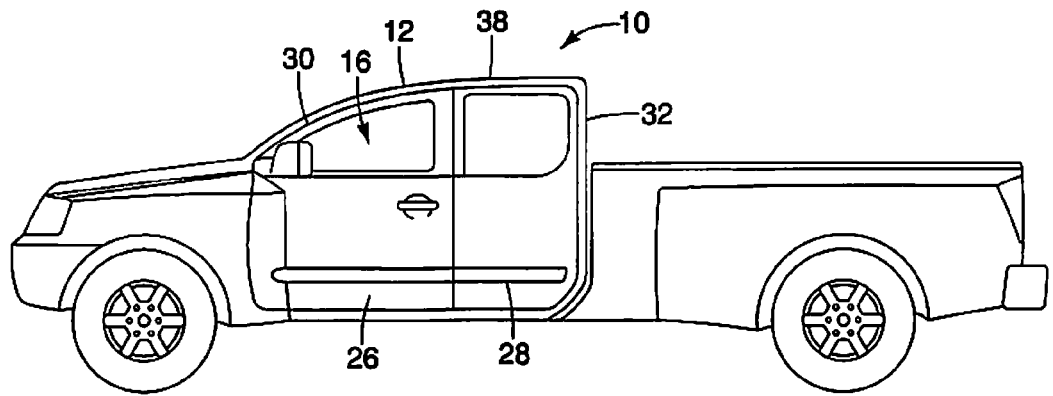
FIG. 1 is a side view of a vehicle that showing a body structure with a rear pillar assembly that at least partially defines a door opening, with doors within the door opening being in a closed orientation in accordance with one embodiment.
Figure 2:
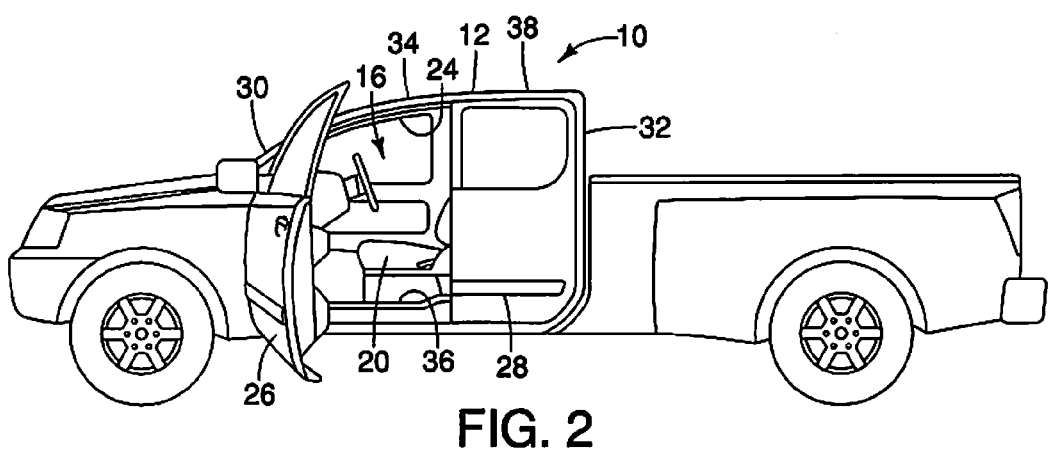
FIG. 2 is another side view of the vehicle showing a front door of the vehicle in an open position showing a portion of a passenger compartment in accordance with the one embodiment.
Figure 3:
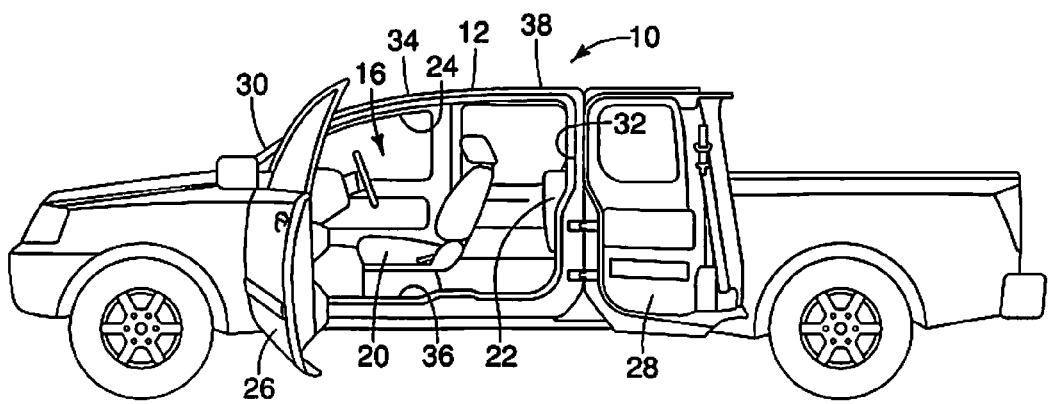
FIG. 3 is yet another side view of the vehicle showing the front door and a rear door of the vehicle in respective open positions showing the passenger compartment and one of the rear pillar assemblies in accordance with the one embodiment.

Referring initially to FIGS. 1-3, a vehicle 10 that includes a vehicle body structure 12 with a reinforcement panel 14 (shown in FIGS. 6 and 10-12) is illustrated in accordance with a first embodiment.

In FIGS. 1-3, the vehicle 10 is depicted as a pickup truck. However, it should be understood from the drawings and the description herein that the vehicle 10 can be any of a variety of vehicle designs and that use of the reinforcement panel 14 is not limited to use with a pickup truck vehicle design.

Figure 4:
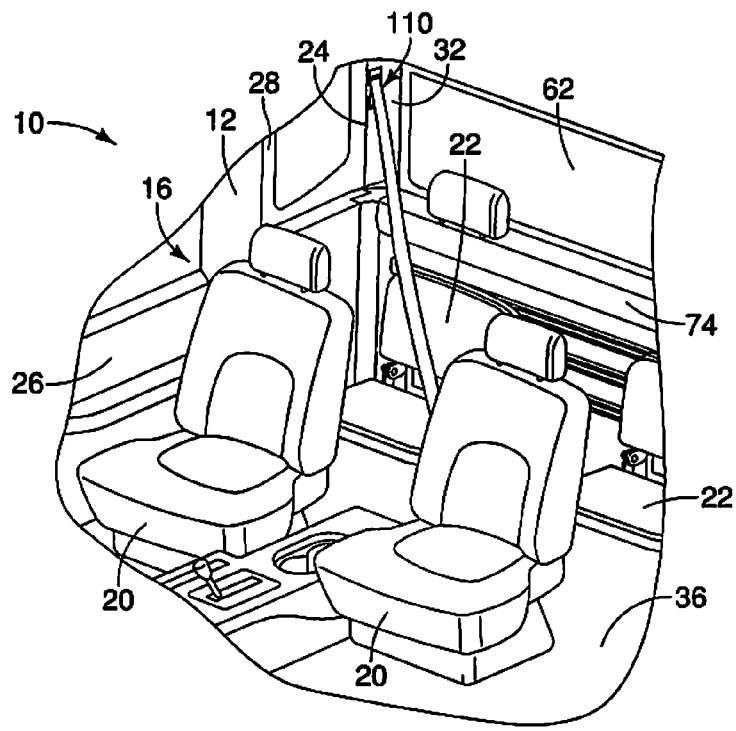
FIG. 4 is a perspective view of the passenger compartment of the vehicle showing rear seats and a seatbelt assembly that is attached to one of the rear pillar assemblies in accordance with the one embodiment.

As shown in FIG. 4, the vehicle body structure 12 of the vehicle 10 includes a passenger compartment 16 that is often referred to as a King Cab or Crew Cab that includes both front seats 20 and rear seats 22. Further as shown in FIG. 1-3, the vehicle body structure 12 includes a single door opening 24 on each side of the vehicle 10, with a front door 26 and a rear door 28. FIG. 1 shows both the front door 26 and the rear door 28 in respective closed positions. FIG. 2 shows the front door 26 in an open position exposing the front row of seats 20 and a front portion of the passenger compartment 16. In FIG. 2, the rear door 28 is closed. In FIG. 3, both the front door 26 and the rear door 28 are in respective open positions exposing the passenger compartment 16, the front seats 20 and the rear seats 22.

The vehicle body structure 12 is formed from a plurality of panels that are welded or otherwise rigidly and non-movably fixed to one another to define the passenger compartment 16. In the depicted embodiment, the vehicle body structure 12 includes, among other features, an A-pillar assemblies 30, a rear pillar assemblies 32, a roof rail 34, a floor 36 and a roof 38. The A-pillar 30 defines a front edge of the door opening 24 and the rear pillar structure 32 defines a rear edge of the door opening 24. There are two rear pillar assemblies 32 in the vehicle body structure 12. The rear pillar assemblies 32 are basically the same with the exception of being approximate symmetrical mirror images of one another. Therefore, in the description below, only one of the rear pillar assemblies 32 is described for the sake of brevity but applies equally to both.

The vehicle body structure 12 can further be divided into a plurality of different sections. For the sake of understanding the overall arrangement of the vehicle body structure 12, description of a side panel assembly 40 of the vehicle body structure 12 is provided with initial reference to FIG. 5.

Figure 5:
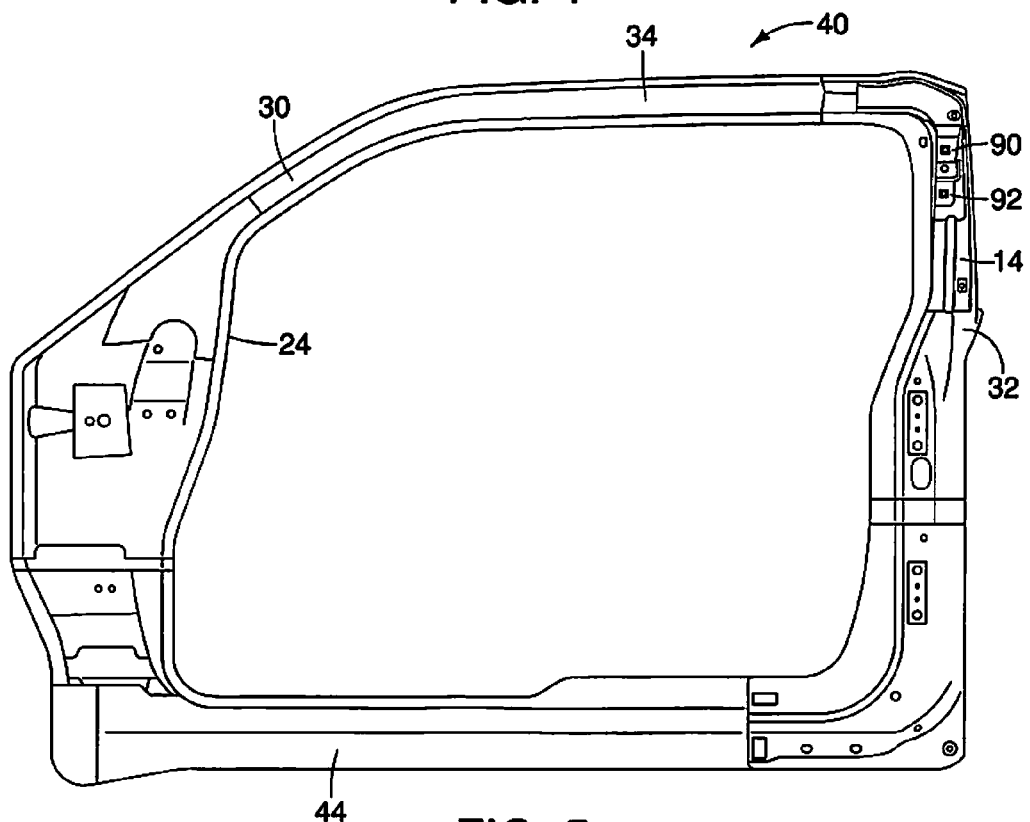
FIG. 5 is an inboard side view of an outer panel of the vehicle body structure shown removed from the vehicle showing a reinforcement panel that includes a first seatbelt anchor support and a second seatbelt anchor support in accordance with the one embodiment.

As shown in FIG. 5 with all trim panels removed, the side panel assembly 40 includes the A-pillar assembly 30, the rear pillar assembly 32, a sill portion 44 and a roof rail 34. The A-pillar assembly 30, the rear pillar assembly 32, the sill portion 44 and the roof rail 34 surround and define the single door opening 24. The sill portion 44 attaches to the floor 36 and basically defines a floor supporting portion of the side panel assembly 40.

Figure 6:
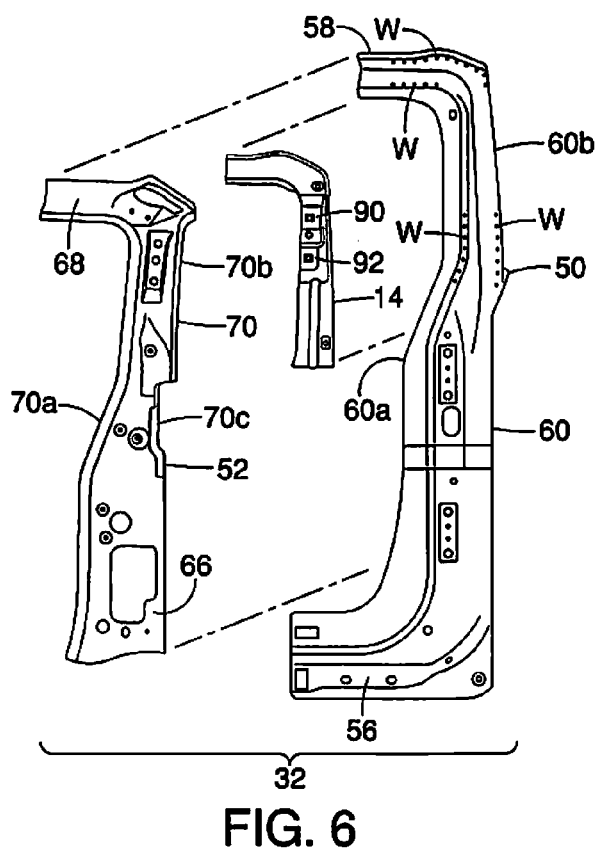
FIG. 6 is a side exploded view of the rear pillar assembly showing a portion of the outer body panel, an inner body panel and the reinforcement panel in accordance with the one embodiment.
Figure 7:
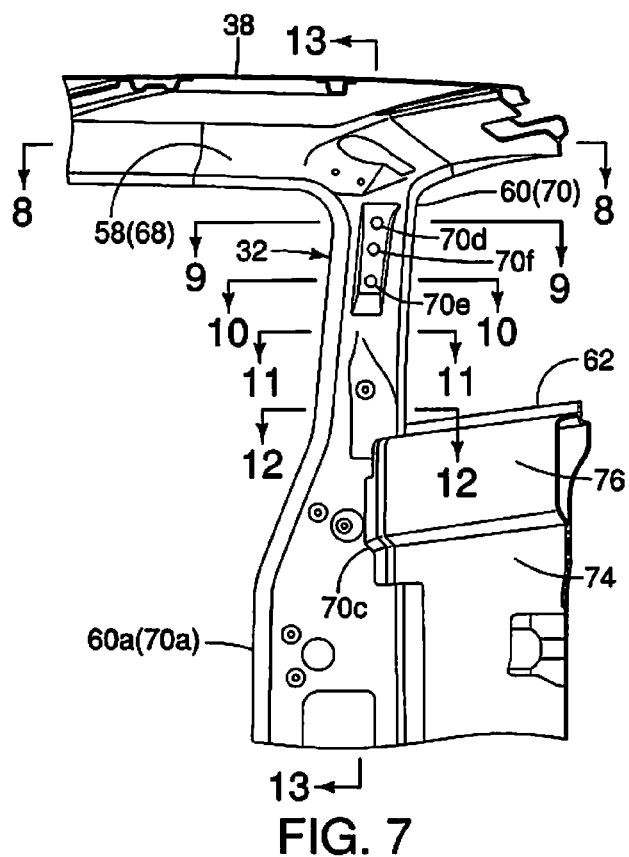
FIG. 7 is a perspective view of a rear corner of the vehicle body structure showing a portion of a roof, a portion of a roof rail, a portion of a rear panel assembly and a portion of the rear pillar assembly in accordance with the one embodiment.
Figure 8:
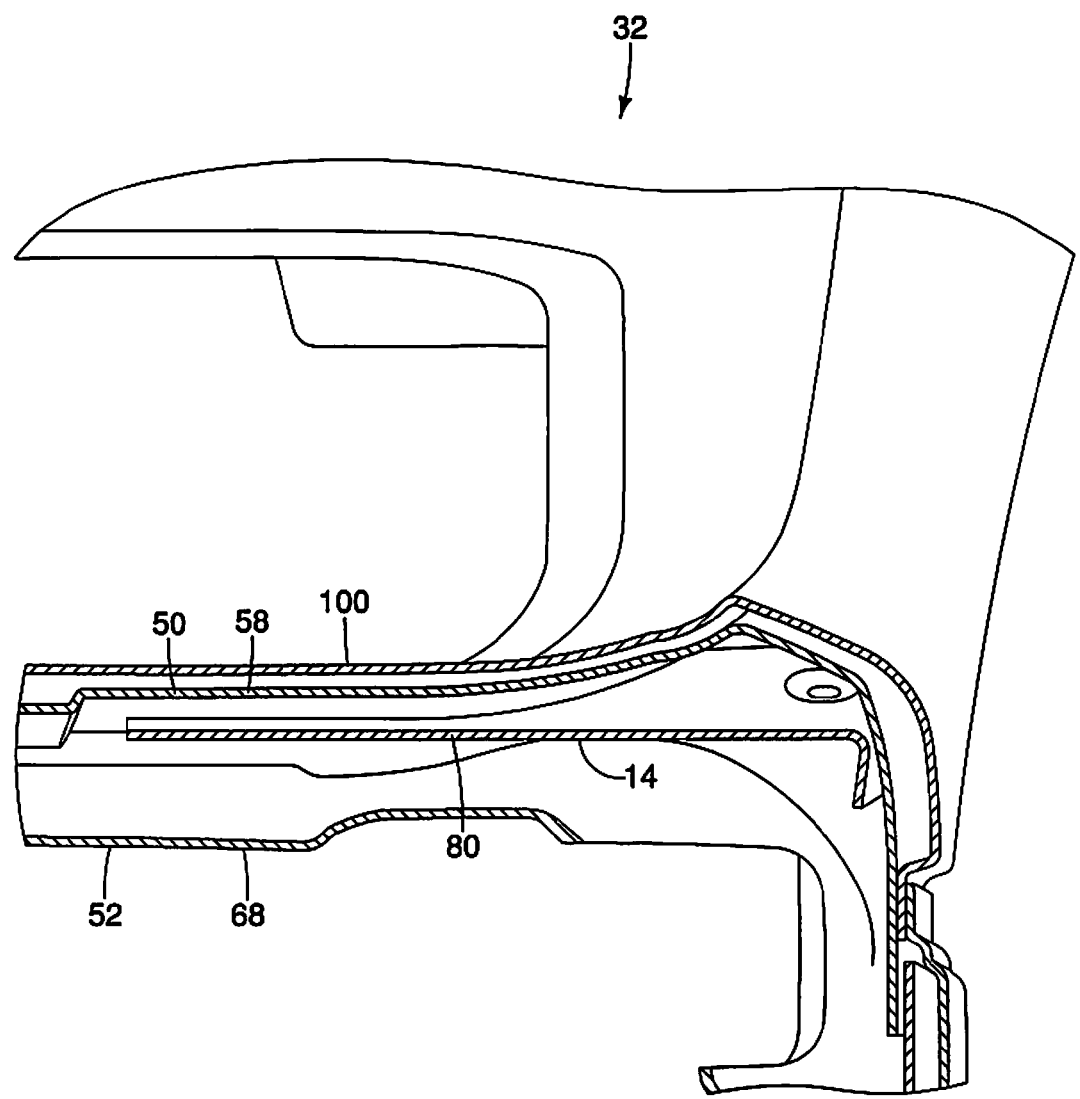
FIG. 8 is a cross-sectional view of a portion of the rear pillar assembly taken along the line 8-8 in FIG. 7 in accordance with the one embodiment.
Figure 9:
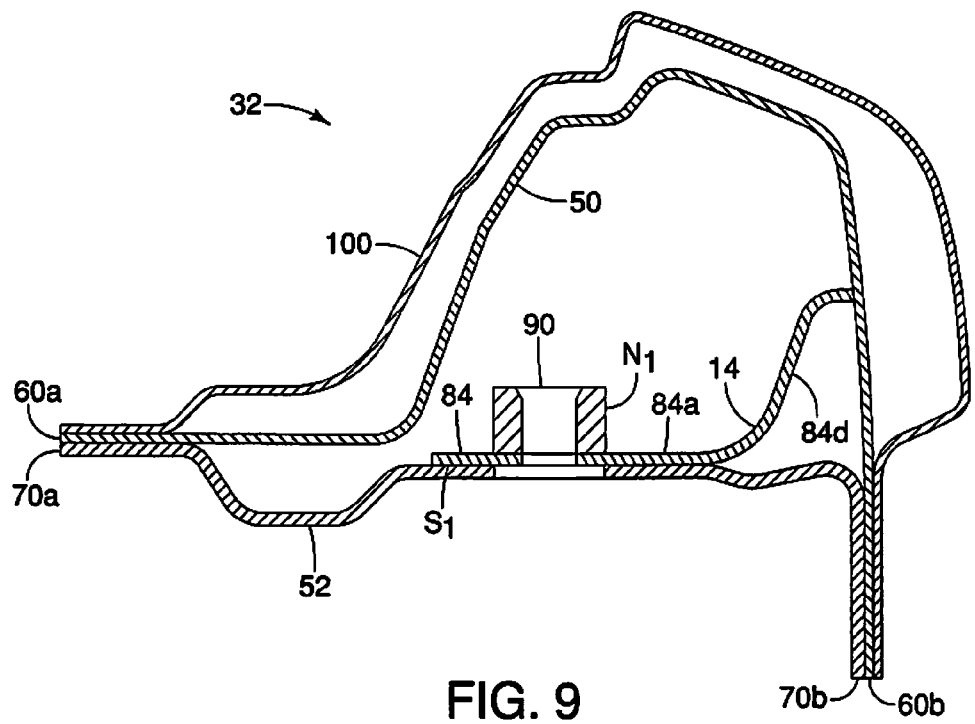
FIG. 9 is a cross-sectional view of another portion of the rear pillar assembly taken along the line 9-9 in FIG. 7 in accordance with the one embodiment.

As shown in FIG. 6, the rear pillar assembly 32 includes at least three panels welded together: an outer body panel 50, an inner body panel 52 and the reinforcement panel 14. The outer body panel 50 includes a floor supporting portion 56, a roof rail portion 58 and a pillar portion 60. The pillar portion 60 extends from the floor supporting portion 56 to the roof rail portion 58. The pillar portion 60 has a front edge 60a that at least partially defines the door opening 24 and a rear edge 60b that at least partially defines a rear window opening 62. As shown in FIGS. 7 and 9, the rear window opening 62 is defined along an upper section of the pillar portion 60, whereas the door opening 24 extends from the roof rail portion 58 down to the floor supporting portion 56.

As is also shown in FIG. 6, the inner body panel 52 includes a lower portion 66, a roof rail portion 68 and a pillar portion 70. The pillar portion 70 extends from the lower portion 66 to the roof rail portion 68. The pillar portion 70 has a front edge 70a that at least partially defines the door opening 24 along with the front edge 60a of the outer body panel 50, and a rear edge 70b that at least partially defines the rear window opening 62 along with the rear edge 70b of the outer body panel 50. The rear edge 70b includes a recessed flange 70c, whose purpose is described further below. The rear window opening 62 is defined in an area above the recessed flange 70c.

As shown in FIGS. 9-12, the front edge 60a of the pillar portion 60 of the outer body panel 50 and the front edge 70a of the pillar portion 70 of the inner body panel 52 are welded to one another in a conventional manner, and, the rear edge 60b of the pillar portion 60 of the outer body panel 50 and the rear edge 70b of the pillar portion 70 of the inner body panel 52 are welded to one another in a conventional manner, thereby further at least partially defining the rear pillar assembly 32. Further, peripheral edge portions of the roof rail portion 58 of the outer body panel 50 and peripheral edge sections of the roof rail portion 68 of the inner body panel 52 are similarly welded to one another. Similarly, peripheral edge portions of the pillar portion 60 below the rear window opening 62 and peripheral edge portions of the lower portion 66 of the inner body panel 52 are welded to one another.

As is described in greater detail below, and shown in FIGS. 6 and 8-13, the reinforcement panel 14 is located in an upper portion of the rear pillar assembly 32 between the outer body panel 50 and the inner body panel 52.

Figure 14:
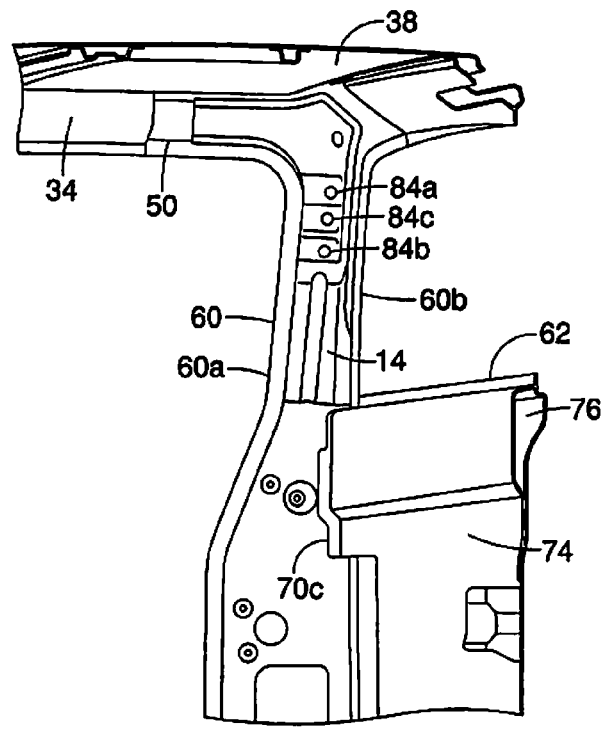
FIG. 14 is a perspective view of a portion of the vehicle body structure showing the rear pillar assembly in accordance with the one embodiment.

As shown in FIG. 14, the outer body panel 50, the reinforcement panel 14 and a rear panel assembly 74 are shown with the inner body panel 52 removed. The rear panel assembly 74 has an upper rail 76 that is fitted with a space defined by the recessed flange 70c and welded in place. An upper edge of the upper rail 76 of the rear panel assembly 74 at least partially defines the rear window opening 62. The reinforcement panel 14 is positioned between the outer body panel 50 and the inner body panel 52 above and adjacent to the recessed flange 70c.

Figure 13:
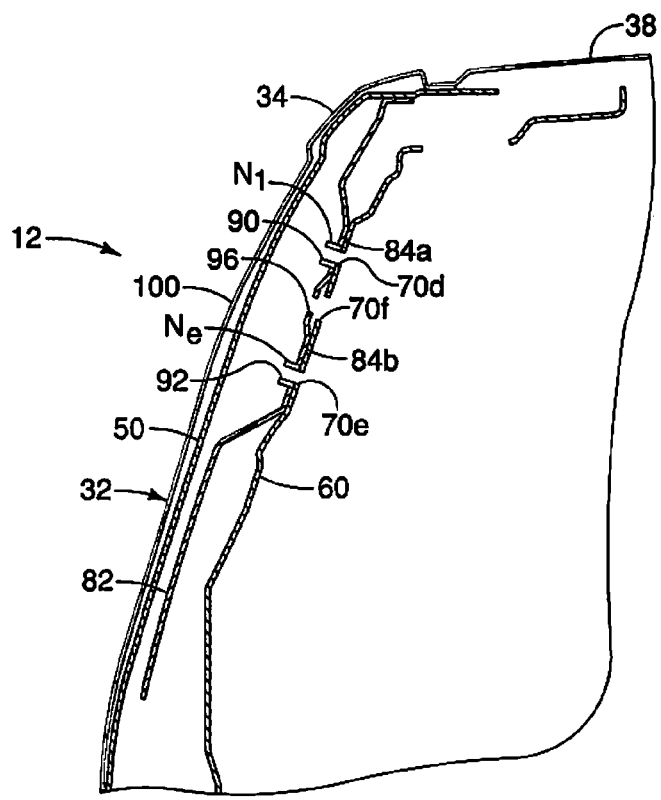
FIG. 13 is a cross-sectional view of a portion of the rear pillar assembly taken along the line 13-13 in FIG. 7 in accordance with the one embodiment.
Figure 15:
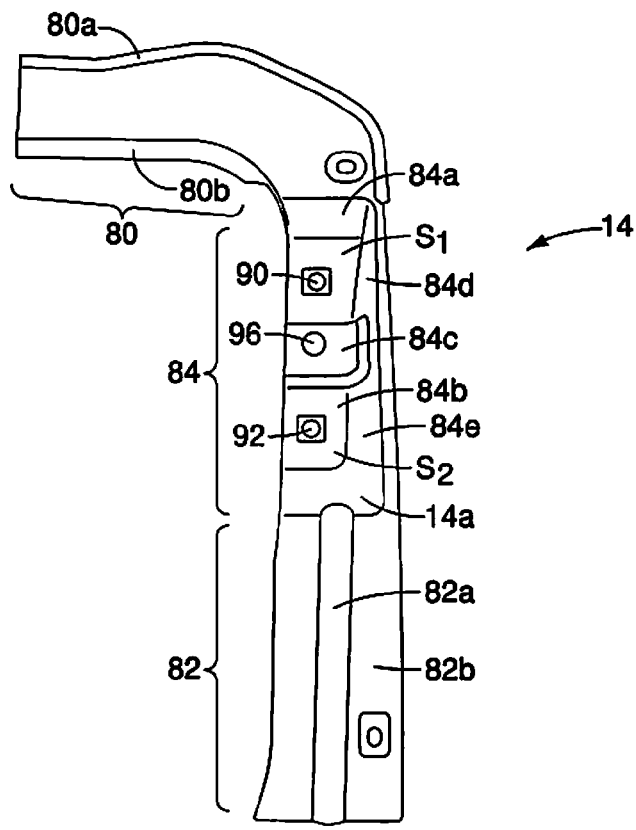
FIG. 15 is a plan view of an inboard side of the reinforcement panel shown removed from the rear pillar assembly in accordance with the one embodiment.

A description of the reinforcement panel 14 is now provided with reference to FIGS. 13-17. The reinforcement panel 14 has an inboard side 14a and an outboard side 14b. FIG. 15 shows the inboard side 14a of the reinforcement panel 14. The reinforcement panel 14 basically includes an upper attachment area 80, a lower attachment area 82 and a main section 84. The upper attachment area 80 includes an upper flange 80a that is welded to a corresponding upper area of the outer body panel 50, as shown in FIG. 13. The upper attachment area 80 also includes a lower flange 80b shown in FIG. 15 that is similarly welded to the outer body panel 50. The upper attachment area 80 is located along the roof rail portion 58 of the outer body panel 50 and at least partially defines the roof rail 34 of the vehicle body structure 12. The upper attachment section 80 includes a contoured surface that extends upward and inward in a direction toward a vehicle longitudinal center of the vehicle 10 and the passenger compartment 16.

The lower attachment area 82 extends downward from the main section 84 to proximate a lower edge of the rear window opening 62. The lower attachment section 82 has a generally flat surface that includes at least one vertically extending rib 82a. Further, the lower attachment section 82 includes a portion 82b that extends upward along a rearward side of a first seatbelt anchor support 90 and a second seatbelt anchor support 92 (described in greater detail below).

The main section 84 of the reinforcement panel 14 extends between the upper attachment section 80 and the lower attachment section 82. The main section 84 includes a first contoured area 84a that defines the first seatbelt anchor support 90 and the second contoured area 84b spaced apart from the first contoured area that defines a second seatbelt anchor support 92. The first contoured area 84a is located vertically above the second contoured area 84b. An intermediate area 84c is formed between the first contoured area 84a and the second contoured area 84b. The intermediate area 84c defines a stiffening surface located below the first contoured area 84a and above the second contoured area 84b. The intermediate area 84c (the stiffening surface) is located outboard relative to the first contoured area 84a and the second contoured area 84b, as shown in FIGS. 16 and 17.

Figure 16:
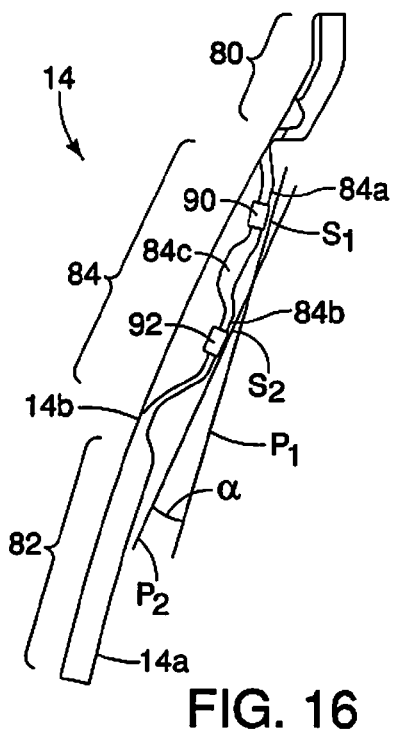
FIG. 16 is a front of the reinforcement panel shown removed from the rear pillar assembly in accordance with the one embodiment.
Figure 17:
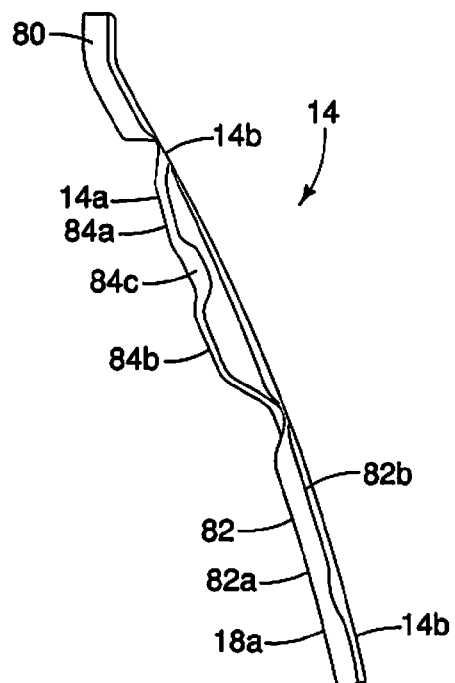
FIG. 17 is a rear of the reinforcement panel shown removed from the rear pillar assembly in accordance with the one embodiment.

As shown in FIG. 16, the first contoured area 84a includes a first surface $S_1$ that defines a first plane $P_1$, and the second contoured area 84b includes a second surface $S_2$ that defines a second plane $P_2$. The first plane $P_1$ and the second plane $P_2$ are angularly offset from one another by an angle $\alpha$ that is approximately 10 degrees. The first contoured area 84a also includes first reinforcement area 84d that extends in an outboard direction from the first surface $S_1$ to the portion 82b of the lower attachment section 82. The second contoured area 84b includes a second reinforcement area 84e that extends in an outboard direction from the second surface $S_2$ to the portion 82b of the lower attachment section 82.

The first and second reinforcement areas 84e provide strength and rigidity to the reinforcement panel 14 and to the rear pillar assembly 32.

Figure 10:
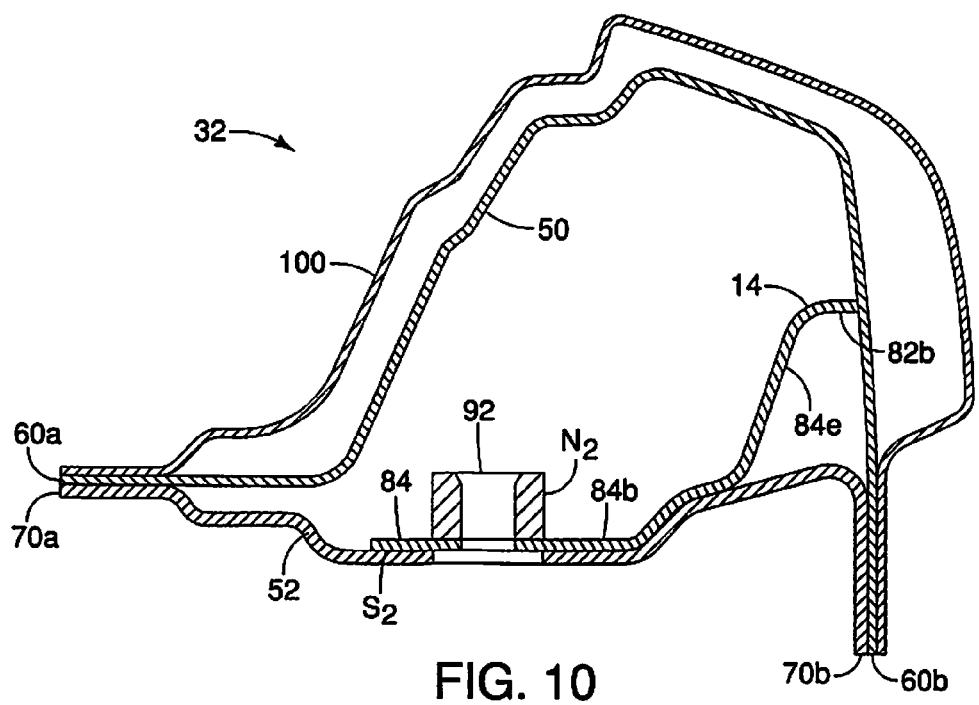
FIG. 10 is a cross-sectional view of yet another portion of the rear pillar assembly taken along the line 10-10 in FIG. 7 in accordance with the one embodiment.
Figure 11:
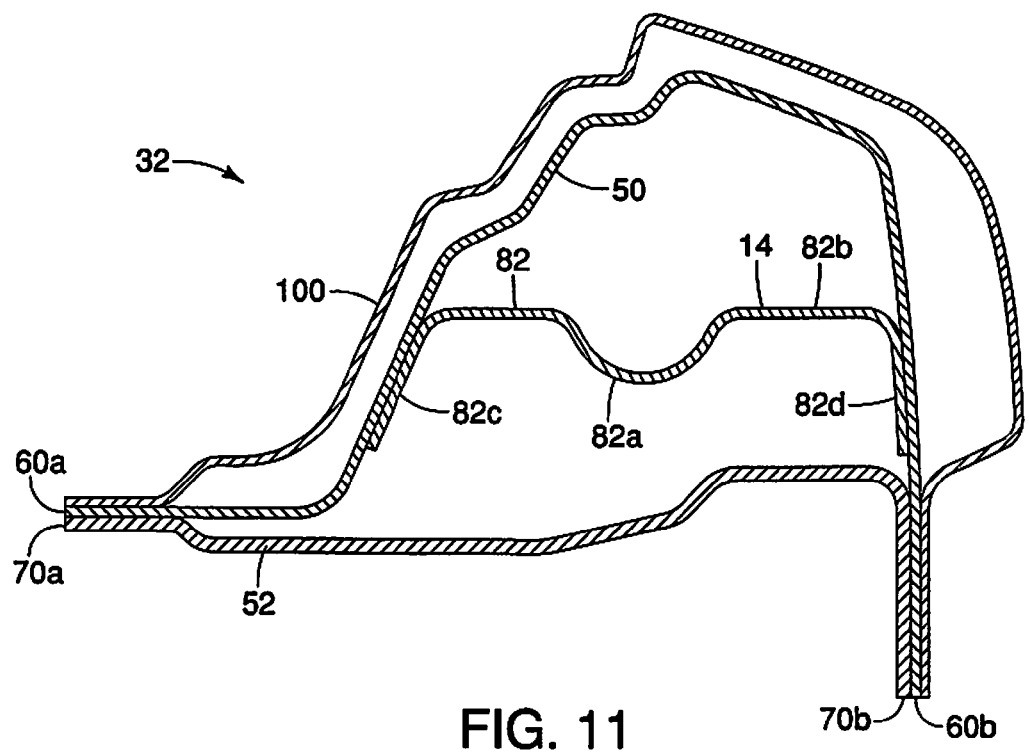
FIG. 11 is a cross-sectional view of still another portion of the rear pillar assembly taken along the line 11-11 in FIG. 7 in accordance with the one embodiment.
Figure 12:
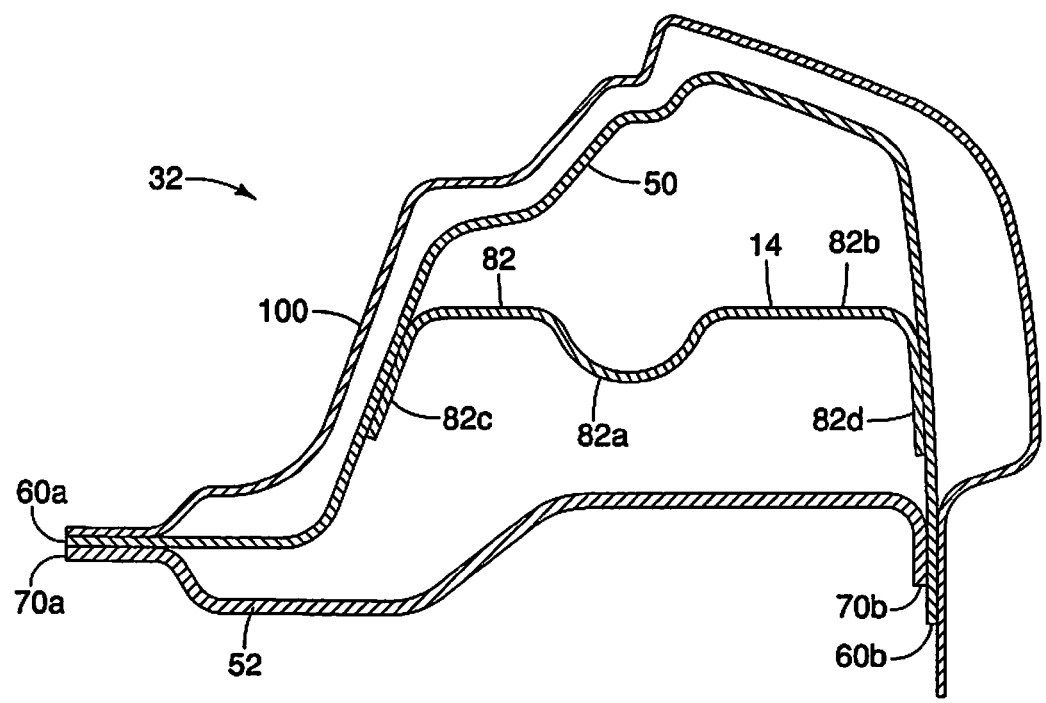
FIG. 12 is a cross-sectional view of another portion of the rear pillar assembly taken along the line 12-12 in FIG. 7 in accordance with the one embodiment.

The first surface $S_1$ of the first contoured area 84a includes the first seatbelt anchor support 90 and the second surface $S_2$ of the second contoured area includes the second seatbelt anchor support 92. As shown in FIGS. 9, 10 and 13, the inner body panel 52 includes a first opening 70d that aligns with the first seatbelt anchor support 90 of the reinforcement panel 14, and a second opening 70e that aligns with the second seatbelt anchor support 92 of the reinforcement panel 14. Further, the first seatbelt anchor support 90 can include a threaded nut $N_1$ (a fastener) welded in place for securing a portion of a seatbelt assembly 110. The second seatbelt anchor support 92 can include a threaded nut $N_2$ (a fastener) welded in place for securing another portion of the seatbelt assembly 110. The seatbelt assembly 110 is described in greater detail below.

Figure 18:
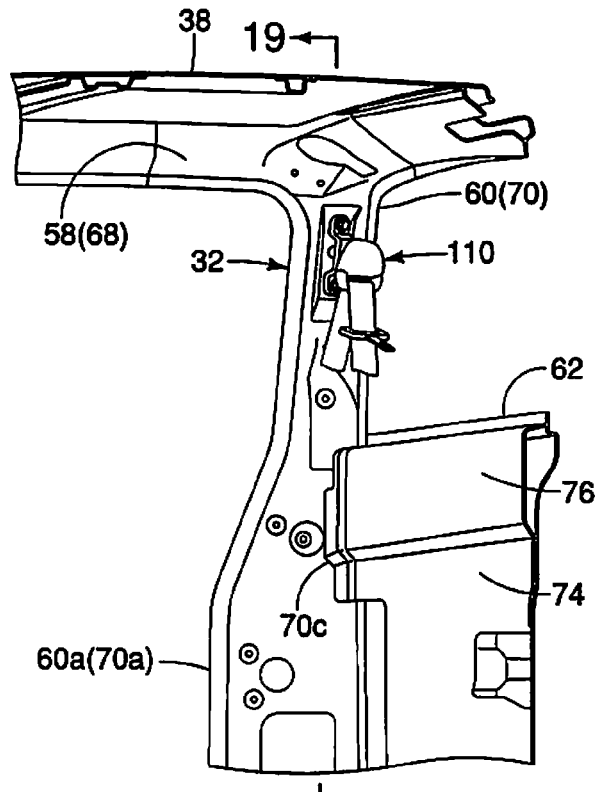
FIG. 18 is a perspective view of the rear corner of the vehicle body structure similar to FIG. 7, showing a seatbelt assembly attached to the rear pillar in accordance with the one embodiment.
Figure 19:
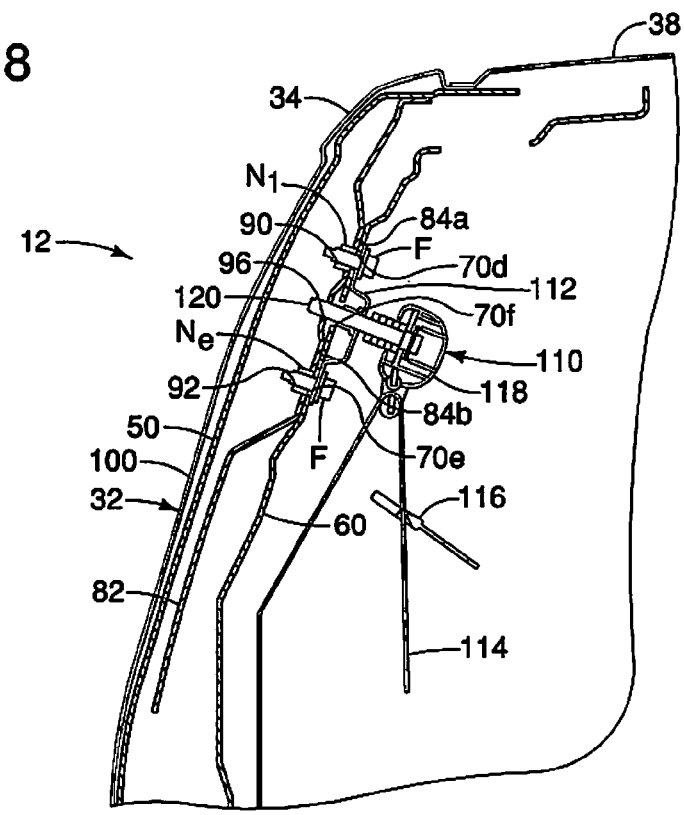
FIG. 19 is a cross-sectional view of the portion of the rear pillar assembly similar to FIG. 13 showing the seatbelt assembly attached to the rear pillar assembly in accordance with the one embodiment.

As shown in FIGS. 4, 18 and 19, the seatbelt assembly 110 is installed to the first seatbelt anchor support 90 and the second seatbelt anchor support 92. Similarly, the intermediate area 84c is provided with an opening 96 and the inner body panel 52 is provided with an opening 70f that aligns with the opening 96.

As shown in FIG. 6, the outer body panel 50 is provided with a plurality of welding sites W. The reinforcement panel 14 can be welded to the outer body panel 50 at the welding sites W using, for example, spot welding techniques. Thereafter the inner body panel 52 is welded to the outer body panel 50. In the depicted embodiment, the inner body panel 52 is not welded to the reinforcement panel 14 as shown in the cross-sectional views presented in FIGS. 8-13. However, in an alternative embodiment, the reinforcement panel 14 and the inner body panel 52 can be welded to one another at predetermined locations.

FIGS. 8-13 also show a finish panel 100 that is further welded to the outer body panel 50. The finish panel 100 is also a structural element of the vehicle body structure 12. However, the finish panel 100 is also a contoured panel that is shaped in accordance with the exterior design of the vehicle 10 in a conventional manner. Since finish panels such as the finish panel 100 are conventional, further description is omitted for the sake of brevity.

The reinforcement panel 14 serves at least two purposes. First, the reinforcement panel 14 adds rigidity and strength to the vehicle body structure 12. In particular, in tests where downwardly directed force is applied to the roof 38 and the rear pillar assemblies 32, the reinforcement panel 14 improves the response to such tests. In particular, inclusion of the reinforcement panel 14 allows for a significant increase in the amount of downwardly directed force applied to the vehicle body structure 12 before deformation of the rear pillar assemblies 32 occurs. Second, the reinforcement panel 14 includes the first seatbelt anchor support 90, the second seatbelt anchor support 92 and the opening 96 which are provided for receiving the seatbelt assembly 110. Therefore, a separate structure for the first seatbelt anchor support 90 and the second seatbelt anchor support 92 can be omitted.

As shown in FIGS. 18 and 19, the seatbelt assembly 110 is attached to the rear pillar assembly 32. As shown in FIG. 19, the seatbelt assembly 110 includes a bracket 112, a belt or strap 114, a seatbelt buckle 116, a pivoting head 118 and a shaft 120. As shown in FIG. 19, the bracket 112 has an upper end bolted via a fastener F to the first seatbelt anchor support 90, a lower end bolted via another fastener F to the second seatbelt anchor support 92 and a central portion that supports the pivoting head 118 and the shaft 120. The pivoting head 118 is supported on the shaft 120. The shaft 120 extends through an aperture in the central portion of the bracket 112, through the opening 70f in the inner body panel 52 and further through the opening 96 of the reinforcement panel 14. Although not shown, the bracket 112 includes structure that prevents movement of the shaft 120 in a direction corresponding to a central axis thereof. The reinforcement panel 14 supports the shaft 120 in that movement in directions transverse to the central axis of the shaft 120 are prevented.

As shown in FIG. 19, the bracket 112 is fixed to the reinforcement panel 14 by the fasteners F. Once the fasteners F are tightened, the reinforcement panel 14 is held in firm contact with the inner body panel 52. More specifically, the fasteners F sandwich the inner body panel 52 between the reinforcement panel 14 and the bracket 112. Thus, even though in the depicted embodiment the inner body panel 52 is not directly welded to the reinforcement panel 14, the fasteners F rigidly fix (attach) the inner body panel 52 to the main section 84 of the reinforcement panel 14. Thus, the outer body panel 50, the reinforcement panel 14 and the inner body panel 52 are rigidly and fixedly attached to one another. Further, when tightened in place, the fasteners F attaching the bracket 112 to the reinforcement panel 14 clamp the inner body panel 50 between the bracket 112 and the reinforcement panel 14.

The strap 114 and the seatbelt buckle 116 are conventional features, therefore further description of the strap 114 and the seatbelt buckle 116 is omitted for the sake of brevity.

The vehicle 10 includes features and components that are well known in the art. Since such vehicle features and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure comprising:
    an outer body panel having a floor supporting portion, a roof rail portion and a pillar portion that at least partially defines a passenger compartment, the pillar portion at least partially defines a pillar assembly that extends from the floor supporting portion to the roof rail portion, the pillar portion having a front edge that at least partially defines a door opening, and a rear edge that at least partially defines a rear window opening; and
    a reinforcement panel rigidly fixed to the outer body panel and including an upper attachment section, a lower attachment section and a main section that extends between the upper attachment section and the lower attachment section, the upper attachment section being attached to the outer body panel along the roof rail portion, the lower attachment section extending downward from the main section to proximate a lower edge of the rear window opening, the lower attachment section including at least one vertically extending rib, the main section including a first contoured area that defines a first seatbelt anchor support and a second contoured area spaced apart from the first contoured area that defines a second seatbelt anchor support.

2. The vehicle body structure according to claim 1, wherein
    the upper attachment section includes a contoured surface that extends upward and inward in a direction toward a vehicle longitudinal center of the passenger compartment.

3. The vehicle body structure according to claim 1, wherein
    the first contoured area is located vertically above the second contoured area.

4. _The vehicle body structure according to claim 1, wherein
    the first contoured area includes a first surface that defines a first plane, and
    the second contoured area includes a second surface that defines a second plane, the first plane and the second plane being angularly offset from one another by an angle that is approximately 10 degrees.

5. The vehicle body structure according to claim 4, wherein
    the first contoured area includes first reinforcement area that extends in an outboard direction from the first surface, and
    the second contoured area includes a second reinforcement area that extends in an outboard direction from the second surface.

6. The vehicle body structure according to claim 4, wherein
    the first surface of the first contoured area includes the first seatbelt anchor support, and
    the second surface of the second contoured area includes the second seatbelt anchor support.

7. The vehicle body structure according to claim 4, further comprising:
    an inner body panel attached to the outer body panel.

8. The vehicle body structure according to claim 7, wherein
    the inner body panel includes a first opening that aligns with the first seatbelt anchor support of the reinforcement panel and a second opening that aligns with the second seatbelt anchor support of the reinforcement panel.

9. The vehicle body structure according to claim 4, wherein
    the reinforcement panel includes an intermediate area formed between the first contoured area and the second contoured area, the intermediate area defining a stiffening surface located below the first contoured area and above the second contoured area, the stiffening surface being located outboard relative to the first contoured area and the second contoured area.

10. The vehicle body structure according to claim 1, wherein
    the first contoured area includes the first seatbelt anchor support, and
    the second contoured area includes the second seatbelt anchor support.

11. The vehicle body structure according to claim 10, further comprising:
    an inner body panel attached to the outer body panel and the reinforcement panel.

12. The vehicle body structure according to claim 1, wherein the lower attachment section extends upward along a rearward side of the first seatbelt anchor support and the second seatbelt anchor support.

13. The vehicle body structure according to claim 1, further comprising:
a seatbelt assembly fixedly attached to the reinforcement panel.

14. A vehicle body structure comprising:
an outer body panel having a floor supporting portion, a roof rail portion and a pillar portion that at least partially defines a passenger compartment, the pillar portion at least partially defines a pillar assembly that extends from the floor supporting portion to the roof rail portion, the pillar portion having a front edge that at least partially defines a door opening, and a rear edge that at least partially defines a rear window opening;
a reinforcement panel rigidly fixed to the outer body panel and including an upper attachment section, a lower attachment section and a main section that extends between the upper attachment section and the lower attachment section, the upper attachment section being attached to the outer body panel along the roof rail portion, the lower attachment section extending downward from the main section to proximate a lower edge of the rear window opening, the main section including a first contoured area that defines a first seatbelt anchor support and a second contoured area spaced apart from the first contoured area that defines a second seatbelt anchor support, the first contoured area including the first seatbelt anchor support, the second contoured area including the second seatbelt anchor support; and
an inner body panel attached to the outer body panel and the reinforcement panel, the inner body panel including a first opening that aligns with the first seatbelt anchor support of the reinforcement panel and a second opening that aligns with the second seatbelt anchor support of the reinforcement panel.

15. A vehicle body structure, comprising:
an outer body panel having a floor supporting portion, a roof rail portion and a pillar portion that at least partially defines a passenger compartment, the pillar portion at least partially defines a pillar assembly that extends from the floor supporting portion to the roof rail portion, the pillar portion having a front edge that at least partially defines a door opening, and a rear edge that at least partially defines a rear window opening;
a reinforcement panel rigidly fixed to the outer body panel and including an upper attachment section, a lower attachment section and a main section that extends between the upper attachment section and the lower attachment section, the upper attachment section being attached to the outer body panel along the roof rail portion, the lower attachment section extending downward from the main section to proximate a lower edge of the rear window opening, the main section including a first contoured area that defines a first seatbelt anchor support and a second contoured area spaced apart from the first contoured area that defines a second seatbelt anchor support; and
an inner body panel rigidly fixed to the outer body panel, and
the seatbelt assembly includes a bracket fixed to the reinforcement panel with a portion of the inner body panel being clamped between the bracket and the reinforcement panel.

* * * * *